United States Patent
Fairweather

(10) Patent No.: US 10,417,320 B2
(45) Date of Patent: Sep. 17, 2019

(54) PROVIDING INSERTION FEATURE WITH CLIPBOARD MANAGER APPLICATION

(71) Applicant: Microsoft Technology Licensing, LLC, Redmond, WA (US)

(72) Inventor: Daniel E Fairweather, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 124 days.

(21) Appl. No.: 15/392,876

(22) Filed: Dec. 28, 2016

(65) Prior Publication Data

US 2018/0181553 A1      Jun. 28, 2018

(51) Int. Cl.
G06F 3/0484 (2013.01)
G06F 17/24 (2006.01)
G06F 9/54 (2006.01)

(52) U.S. Cl.
CPC .......... *G06F 17/24* (2013.01); *G06F 3/04842* (2013.01); *G06F 9/543* (2013.01); *G06F 2203/04803* (2013.01)

(58) Field of Classification Search
CPC .................. G06F 3/0484; G06F 17/24; G06F 2203/04803; G06F 9/543
See application file for complete search history.

(56) References Cited

U.S. PATENT DOCUMENTS

| | | | |
|---|---|---|---|
| 6,309,305 B1 | 10/2001 | Kraft | |
| 8,020,101 B2 | 9/2011 | Kesavarapu | |
| 8,935,624 B2 | 1/2015 | Russak et al. | |
| 8,949,729 B2 | 2/2015 | Bastide et al. | |
| 9,069,432 B2 | 6/2015 | Eylon | |
| 2005/0172241 A1 | 8/2005 | Daniels et al. | |
| 2009/0044140 A1 | 2/2009 | Chen et al. | |
| 2011/0202971 A1 | 8/2011 | Margolin | |
| 2013/0139087 A1* | 5/2013 | Eylon | G06F 3/048 715/770 |
| 2014/0258905 A1 | 9/2014 | Lee et al. | |
| 2015/0370620 A1 | 12/2015 | Lai et al. | |
| 2016/0342449 A1 | 11/2016 | Wong et al. | |

FOREIGN PATENT DOCUMENTS

WO      2015002962 A1      1/2015

OTHER PUBLICATIONS

"Clipboard History", http://web.archive.org/web/20160805022745/https:/www.alfredapp.com/help/features/clipboard/, Published on: Aug. 5, 2016, 4 pages.
"IClipboard6", http://chronosnet.com/Products/iclipboard.html, Retrieved on: Oct. 27, 2016, 6 pages.

(Continued)

*Primary Examiner* — Andrea C Leggett

(57) ABSTRACT

An insertion feature is provided with a clipboard manager application. The clipboard manager application initiates operations to provide the insertion feature upon detecting a copy operation. In response, an item associated with the copy operation is stored. Next, a paste input is intercepted. A sample content of the item is rendered in a clipboard user interface (UI) for a selection. Upon detecting the item as selected, the item is inserted into a previously active application.

20 Claims, 7 Drawing Sheets

(56) References Cited

OTHER PUBLICATIONS

"Clipboard History", http://web.archive.org/web/20090411030747/http:/www.obdev.at/resources/launchbar/help/ClipboardHistory.html, Published on: Apr. 11, 2009, 3 pages.

"Copied", http://web.archive.org/web/20161002112937/http:/copiedapp.com/, Published on: Oct. 2, 2016, 9 pages.

"Copy and Paste Multiple Items by Using the Office Clipboard", https://support.office.com/en-us/article/Copy-and-paste-multiple-items-by-using-the-Office-Clipboard-714A72AF-1AD4-450F-8708-C2931E73EC8A, Retrieved on: Oct. 27, 2016, 20 pages.

"International Search Report and Written Opinion Issued in PCT Application No. PCT/US2017/067148", dated Apr. 13, 2018, 15 Pages.

\* cited by examiner

PROVIDING INSERTION FEATURE WITH CLIPBOARD MANAGER APPLICATION

BACKGROUND

Information exchange have changed processes associated work and personal environments. Automation and improvements in processes have expanded scope of capabilities offered for personal and business consumption. With the development of faster and smaller electronics, providing elaborate features (that improve functionality) in an operating system have become feasible. Indeed, applications provided to coincide with and/or override existing features of an operating system have become common features in modern personal and work environments. Such systems execute a wide variety of applications ranging from document productivity applications to process management applications.

A clipboard application provides a user with a way to capture and re-use previously copied item(s). The clipboard application adds an item history to a traditional single item clipboard provided by an operating system. However, modern clipboard applications fail to seamlessly integrate with a system clipboard. A user who desires to re-use an item with the clipboard application is forced to execute a re-copy operation. The re-copy operation moves the item into the system clipboard for an execution of a subsequent paste operation. The re-copy operation flow is inefficient and confusing because the flow forces the user to manage an item across two clipboards (the system clipboard and a local clipboard of the clipboard application). The re-copy operation flow prevents the user from executing a paste operation directly from the clipboard application because the user is forced to route the item through the system clipboard.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to an insertion feature provided with a clipboard manager application. The clipboard manager application, according to embodiments, may initiate operations to provide the insertion feature upon detecting a copy operation. In response, an item associated with the copy operation may be stored. Next, a paste input may be intercepted. A sample content of the item may be rendered in a clipboard user interface (UI) for a selection. Upon detecting the item as selected, the item may be inserted into a previously active application.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
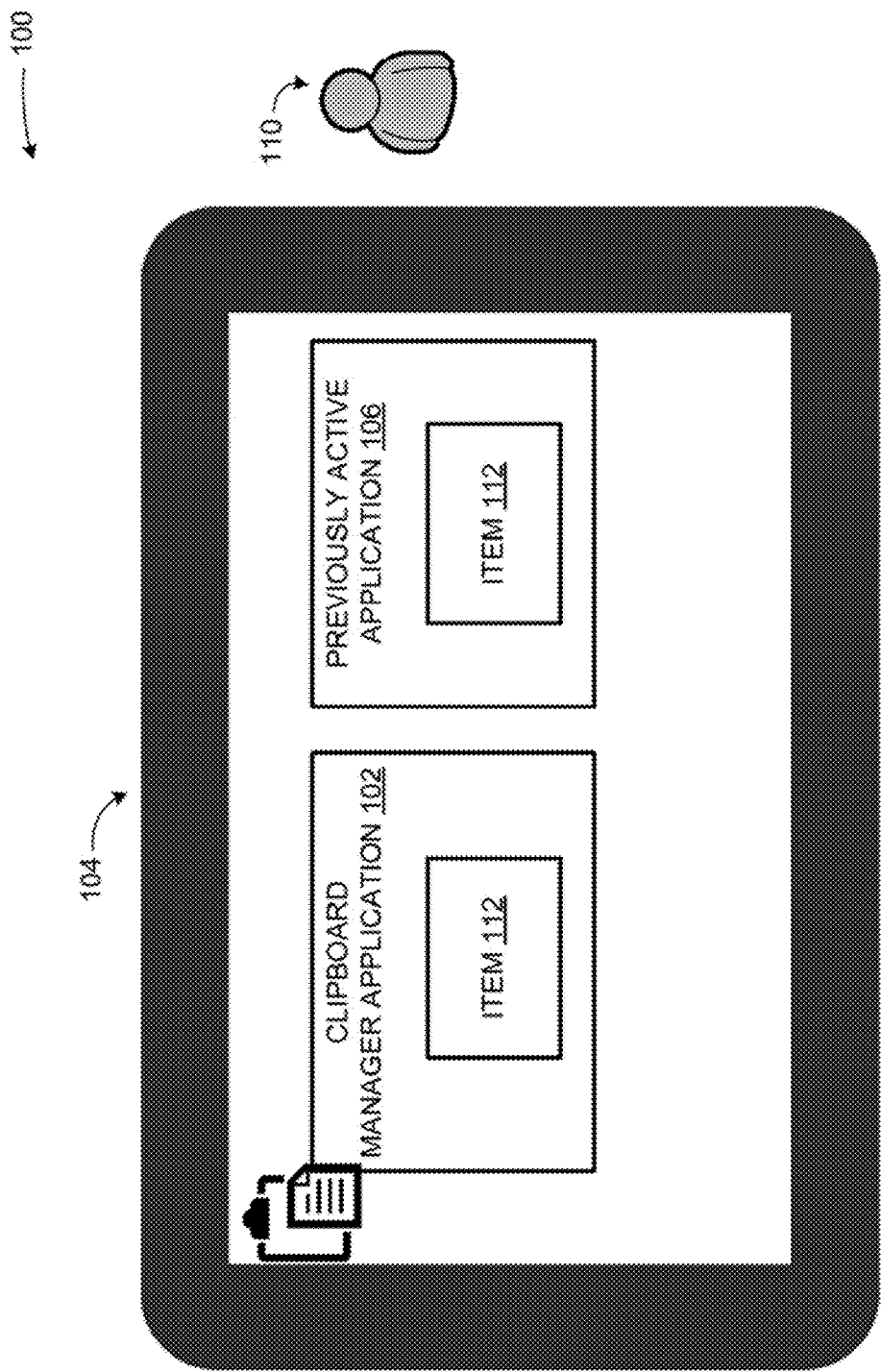
FIG. 1 is a conceptual diagram illustrating an example of providing an insertion feature with a clipboard manager application, according to embodiments.

As briefly described above, a clipboard manager application may provide an insertion feature. In an example scenario, the clipboard manager application may detect a copy operation. The copy operation may capture a selected item and store the item in a cache (such as a system clipboard) in preparation for a paste operation. The clipboard manager application may replace a workflow of an operating system (that provides copy and paste operations) with a clipboard user interface (UI) to provide a user with preview and selection features for managing item(s) selected for copy and paste operations.

An item associated with the copy operation may be stored upon detecting the copy operation. The item may be stored in a local cache accessible by the clipboard manager application. Alternatively, the clipboard manager application may store the item in a system clipboard provided by an operating system (OS). The item may be stored along with previously stored item(s). The OS may execute and/or manage the clipboard application and other application(s) associated with the copy and/or paste operations.

Next, a paste input may be intercepted. The paste input may include an input detected as associated with a paste operation. The clipboard manager application may override a workflow of a default system paste operation by rendering a sample content of the item in a clipboard user interface (UI) for a selection. The clipboard UI may be provided to expand features associated with the copy and/or paste operations by providing the user with preview and selection features associated with the item and previously stored item(s). Upon detecting the item as selected, the item may be inserted into a previously active application.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a physical computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to provide an insertion feature with a clipboard manager application. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

FIG. 1 is a conceptual diagram illustrating examples of providing an insertion feature with a clipboard manager application, according to embodiments.

In a diagram 100, a computing device 104 may execute a clipboard manager application 102. The computing device 104 may include a physical computer and/or a mobile computing device such as a smart phone and/or similar ones. The computing device 104 may also include a special purpose and/or configured device that is optimized to execute data operations associated with the clipboard manager application 102. For example, the computing device 104 may include physical components that are custom built to accelerate copy and/or paste operations through multiple computation cores tailored to manage number of items selected for the copy and/or paste operations.

The computing device 104 may execute the clipboard manager application 102. The clipboard manager application 102 may initiate operations to provide an insertion feature upon detecting a copy operation (such as a copy operation initiated by a user 110). The copy operation may capture an item 122 (that is selected) and store the item 122 in a cache (such as a system clipboard) in preparation for a paste operation. The item may include data (such as text, an image) and/or a file (such as a document), among others. The clipboard manager application 102 may replace (or override) a workflow of an operating system (that provides copy and paste operations) with a clipboard user interface (UI) to provide a user 110 with preview and selection features for managing item(s) selected for copy and paste operations.

In response to detecting the copy operation, the item 112 associated with the copy operation may be stored. The item may be stored in a local cache accessible by the clipboard manager application 102. Alternatively, the clipboard manager application 102 may store the item in a system clipboard provided by an operating system (OS). The item 112 may be stored along with previously stored item(s). The OS may execute and/or manage the clipboard manager application 102 and other application(s) associated with the copy and/or paste operations.

Next, a paste input may be intercepted. The paste input may be detected as provided by the user 110. Furthermore, the paste input may include an input detected as associated with a paste operation. The clipboard manager application 102 may replace a workflow of a default system paste operation by rendering a sample content of the item 112 in a clipboard user interface (UI) to prompt the user 110 for a selection. The clipboard UI may be provided to expand features associated with the copy and/or paste operations by providing the user 110 with preview and selection features associated with the item 112 and previously stored item(s). Upon detecting the item 112 as selected, the item 112 may be inserted into a previously active application 106. The previously active application 106 may be identified as an application that previously had an OS focus (for example, the user 110 has interacted with the previously active application 106). The previously active application 106 may also provide the item 112 for the copy operation. Alternatively, the item 112 may also be inserted to an application selected by the user 110 to complete the paste operation.

The computing device 104 may communicate with other client device(s) or server(s) through a network. The network may provide wired or wireless communications between network nodes such as the computing device 104, other client device(s) and/or server(s), among others. Previous example(s) to provide an insertion feature with the clipboard manager application 102 are not provided in a limiting sense. Alternatively, the copy and/or paste operations may be intercepted and processed by an application programming interface (API) for further operations, among others. Furthermore, a service hosted by a physical server may provide a client interface such as the clipboard manager application 102 that dynamically manages copy and/or paste operations at the computing device 104 (for example, a component of a browser application managing copy and/or paste operations).

The user 110 may interact with the clipboard manager application 102 with a keyboard based input, a mouse based input, a voice based input, a pen based input, and a gesture based input, among others. The gesture based input may include one or more touch based actions such as a touch action, a swipe action, and a combination of each, among others.

While the example system in FIG. 1 has been described with specific components including the computing device 104, the clipboard manager application 102, embodiments are not limited to these components or system configurations and can be implemented with other system configuration employing fewer or additional components.

Figure 2:
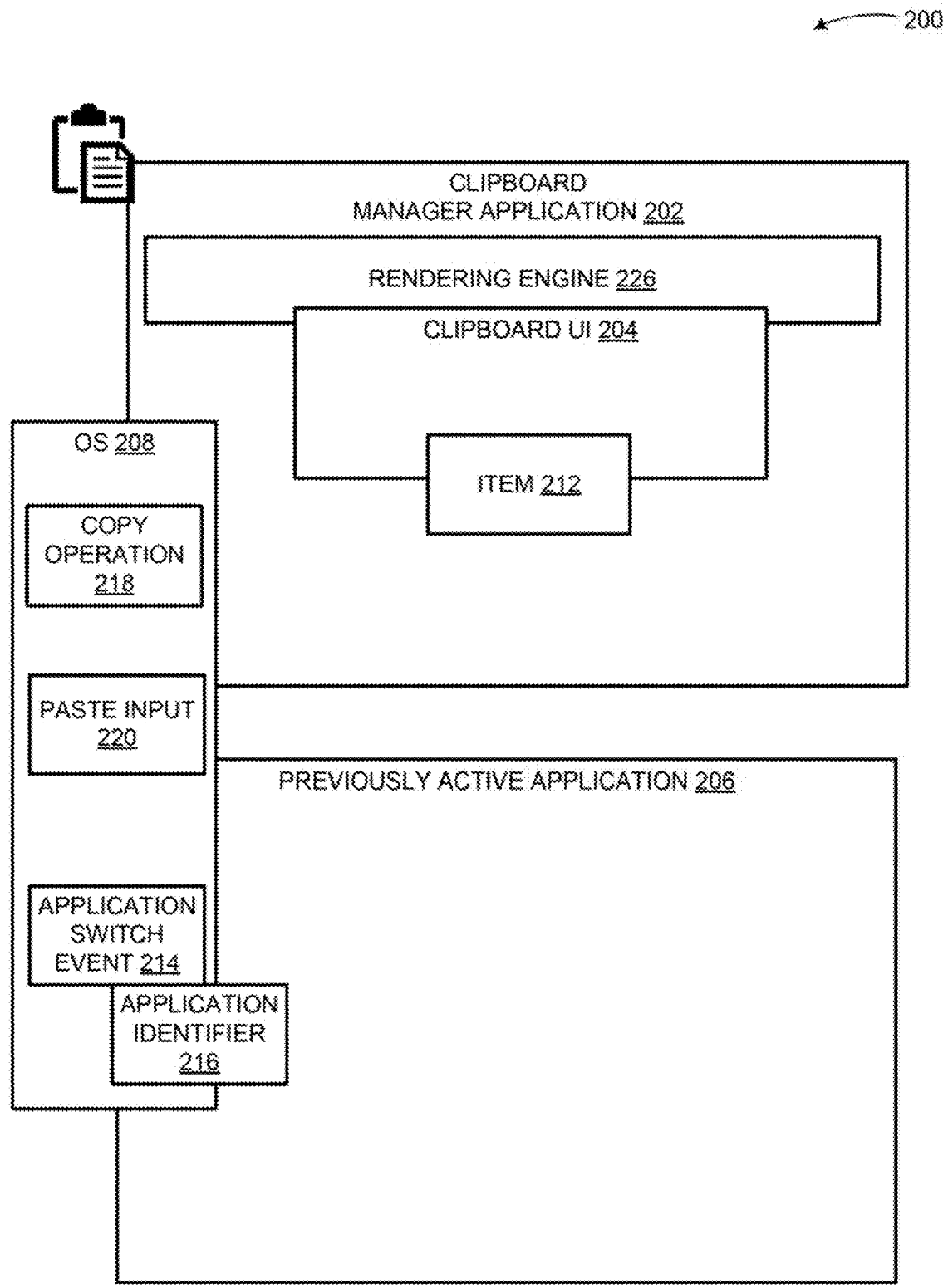
FIG. 2 is a display diagram illustrating example components of a clipboard manager application that provides an insertion feature, according to embodiments.

FIG. 2 is a display diagram illustrating example components of a clipboard manager application that provides an insertion feature, according to embodiments.

In a diagram 200, a rendering engine 226 of a clipboard manager application 202 may store an item 212 associated with a copy operation 218. The copy operation 218 may be initiated by a user. The target of the copy operation 218 may include a previously active application 206. As such, the clipboard manager application 202 may monitor OS focus shifts from the previously active application 206 to a currently active application.

The rendering engine 226 of the clipboard manager application 202 may identify the previously active application 206 by monitoring an application switch event 214 emitted by an operating system 208. The OS 208 may trigger the application switch event 214 whenever the OS 208 detects an OS focus shift from the previously active application 206 to a currently active application. For example, the OS 208 may trigger the application switch event 214 in response to a user interaction to switch the OS focus from a UI of the previously active application 206 to a UI of a currently active application.

The OS 208 may execute and manage the clipboard manager application 202 and the previously active application 206. As such, the clipboard manager application 202 may reside within an environment provided by the OS 208 and have access to operations executed by the OS 208. For example, the clipboard manager application 202 may record an application identifier 216 upon detecting the application switch event 214. The application switch event 214 may be exposed to the clipboard manager application 202 by the OS 208 or the clipboard manager application 202 may register with the OS 208 to receive the application switch event 214. The application switch event 214 may include an application identifier 216 that corresponds to the previously active application 206. The rendering engine 226 of the clipboard manager application 202 may identify the previously active application 206 from the application identifier 216. For example, the application identifier 216 may include a process number associated with the previously active application 206. The process number may be used to identify the previously active application 206 and interact with the previously active application 206.

In an alternative scenario, the rendering engine 226 may identify the clipboard manager application 202 from an application identifier (exposed by an application switch event), the application switch event may be ignored. The application switch event may be disregarded because the OS focus shift (that triggered the application switch event) resulted from shifting the OS focus away from a clipboard UI 204 of the clipboard manager application 202. As such, the application switch event 214 may not be considered related to the copy operation 218 because the OS focus shift away from the clipboard UI 204 may not initiate a copy operation.

The rendering engine 226 of the clipboard manager application 202 may interrupt a copy and/or paste operation workflow of the OS 208 upon detecting a paste input 220. The rendering engine 226 may provide the clipboard UI 204 to the user to prompt the user to select the item 212 or other item(s) presented by the clipboard UI 204 (through sample content). In response to detecting a selection of the item 212, the rendering engine 226 may place the item 212 into a system clipboard. The system clipboard may include a cache (to temporarily store the item 212 during copy and/or paste operations) provided by the OS 208. The system clipboard may be used to initiate a system paste operation by the OS 208. The rendering engine 226 may activate the previously active application 206 by shifting the OS focus to the previously active application 206. Next, the system paste operation may be initiated by prompting the OS 208 to insert the item 212 into the previously active application 206.

Figure 3:
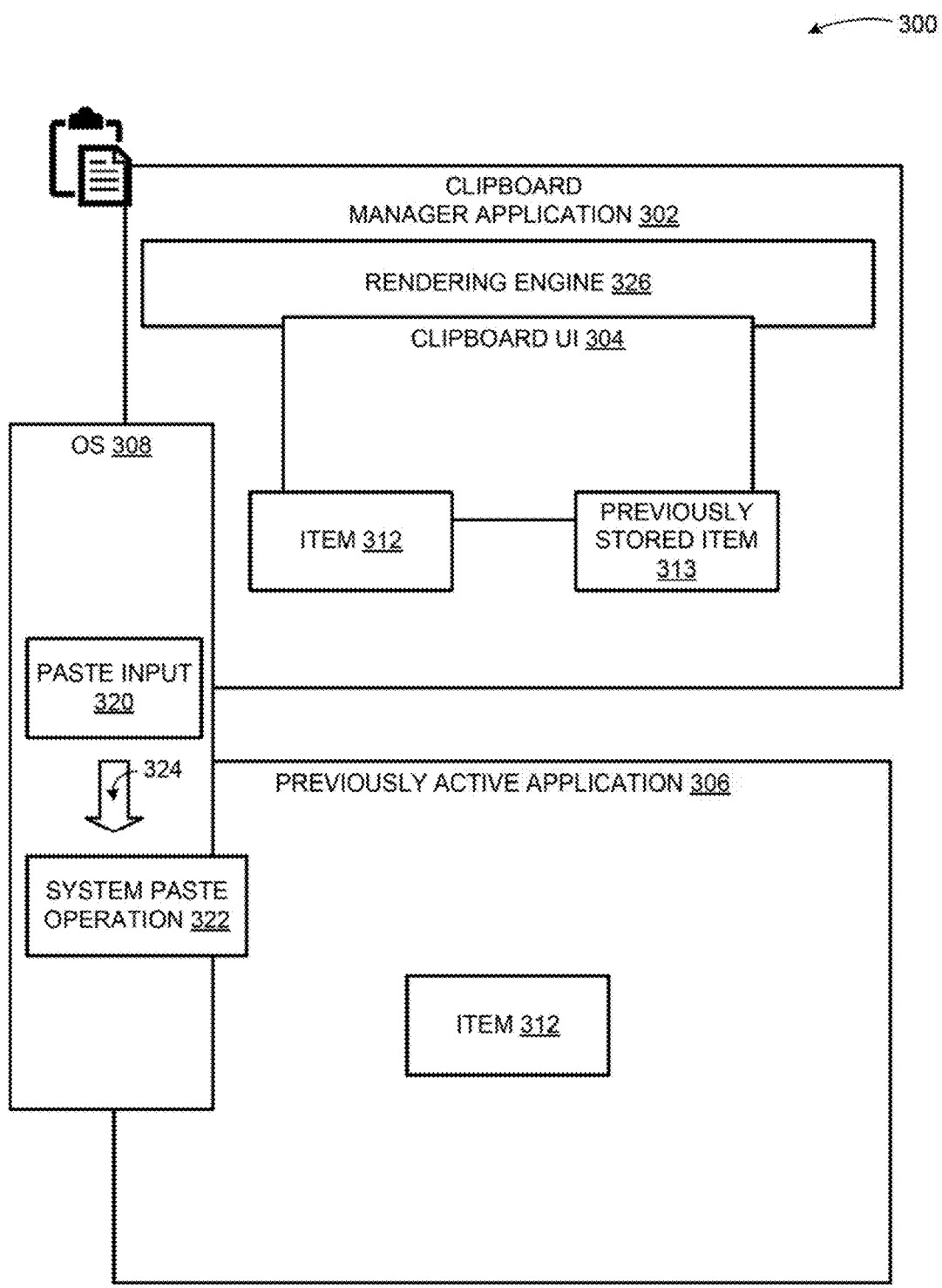
FIG. 3 is a display diagram illustrating components of a scheme to provide an insertion feature with a clipboard manager application, according to embodiments.

FIG. 3 is a display diagram illustrating components of a scheme to provide an insertion feature with a clipboard manager application, according to embodiments.

In a diagram 300, a rendering engine 326 of the clipboard manager application 302 may provide a clipboard UI 304 to present a sample content for each of an item 312 (stored as a result of a detected copy operation) and a previously stored item 313. The clipboard manager application may interrupt a copy and paste operation workflow and present the clipboard UI 304 to prompt a user to make a selection from the item 312 or the previously stored item 313. For example, the rendering engine 326 may rank the item and the previously stored item in an order based on a timestamp of the copy operation associated with the item 312 and the previously stored item 313. If the item 312 has been copied after the previously stored item 313, the rendering engine 326 may present the sample content of the item 312 before the sample content of the previously stored item 313 (in the clipboard UI 304 to emphasize the item 312 that was recently copied compared to the previously stored item 313.

Alternatively, the rendering engine 326 may present the sample content of the previously stored item 313 before the sample content of the item 312 to emphasize the previously stored item 313 that resided within a cache of the clipboard manager application 302 longer than the item 312. A direction of the order of the item 312 and the previously stored item 313 may be determined based on a setting associated with the clipboard manager application 302 that may be reversed dynamically by the OS 308 or manually by the user.

In another example scenario, the item 312 and the previously stored item 313 may be ranked in an order based on a number of paste operations associated with the item and the previously stored item (in a scenario where the item 312 and the previously stored item 313 persist in the clipboard UI 304 based on a time period, a user preference, and/or other criteria). The sample content of the item 312 may be rendered before the sample content of the previously stored item 313 in the clipboard UI 304 if the item 312 is associated with more paste operations than the previously stored item 313. As such, the item 312 may be emphasized by the order of the presentation in the clipboard UI 304 based on the number of the paste operations associated with the item 312 (and the previously stored item 313). Furthermore, the item 312 and the previously stored item 313 may be ranked based on a number of attributes associated with the items. The order of the ranking may be reversed based on an OS setting or a manual feedback by the user. The item 312 and the previously stored item 313 (and other stored item(s)) may be presented as ordered based on an attribute associated with the stored item 312 and/or the previously stored item 313 to inform and present the user with selection guidance to complete the paste operation.

In another example scenario, the rendering engine 326 of the clipboard manager application 302 may intercept a paste input 320 (provided by the user) and render the sample content for the item 312 and the previously stored item 313 in the clipboard UI 304. The rendering engine 326 may intercept the paste input 320 by unregistering an OS trigger 324 between the paste input and a system paste operation 322. An unregister operation may instruct the OS 308 to stop initiating the OS trigger 324 to activate the system paste operation 322 upon detecting the paste input 320. As such, the clipboard manager application 302 may prevent the OS 308 from activating the system paste operation 322 automatically in response to the paste input 320.

The rendering engine 326 may instead generate (and/or override) the system paste operation 322 based on the item 312 (after a selection from the clipboard UI 304 by the user to do as such). The system paste operation 322 may include instructions to insert the item 312 into the previously active application 306. Next, the rendering engine 326 may initiate the system paste operation 322 to insert the item 312 into the previously active application 306. Alternatively, the rendering engine 326 may also generate and/or overwrite the system paste operation 322 to insert the item 312 into an application chosen by the user and/or by other entity controlling the clipboard manager application 302.

Furthermore, the rendering engine 326 may repurpose the OS trigger 324 by registering the OS trigger 324 to initiate the clipboard UI 304 upon detecting other paste input. The registration operation may instruct the OS 308 to redirect the paste input 320 to the rendering engine 326 of the clipboard manager application 302. As such, upon detecting other paste input, the rendering engine 326 may render the clipboard UI 304 instead of the other paste input causing the OS 308 to automatically activate the system paste operation 322.

Moreover, the copy and/or paste operations may be restored to default flow of operations upon a deactivation of the clipboard manager application 302. Upon detecting a deactivation input, the clipboard manager application 302 may reregister the OS trigger 324 between the paste input 320 and the system paste operation 322 to restore the default flow of copy and/or paste operations. In response to the deactivation input, the clipboard manager application 302 may shut down and the OS 308 may manage paste and/or copy operations.

Figure 4:
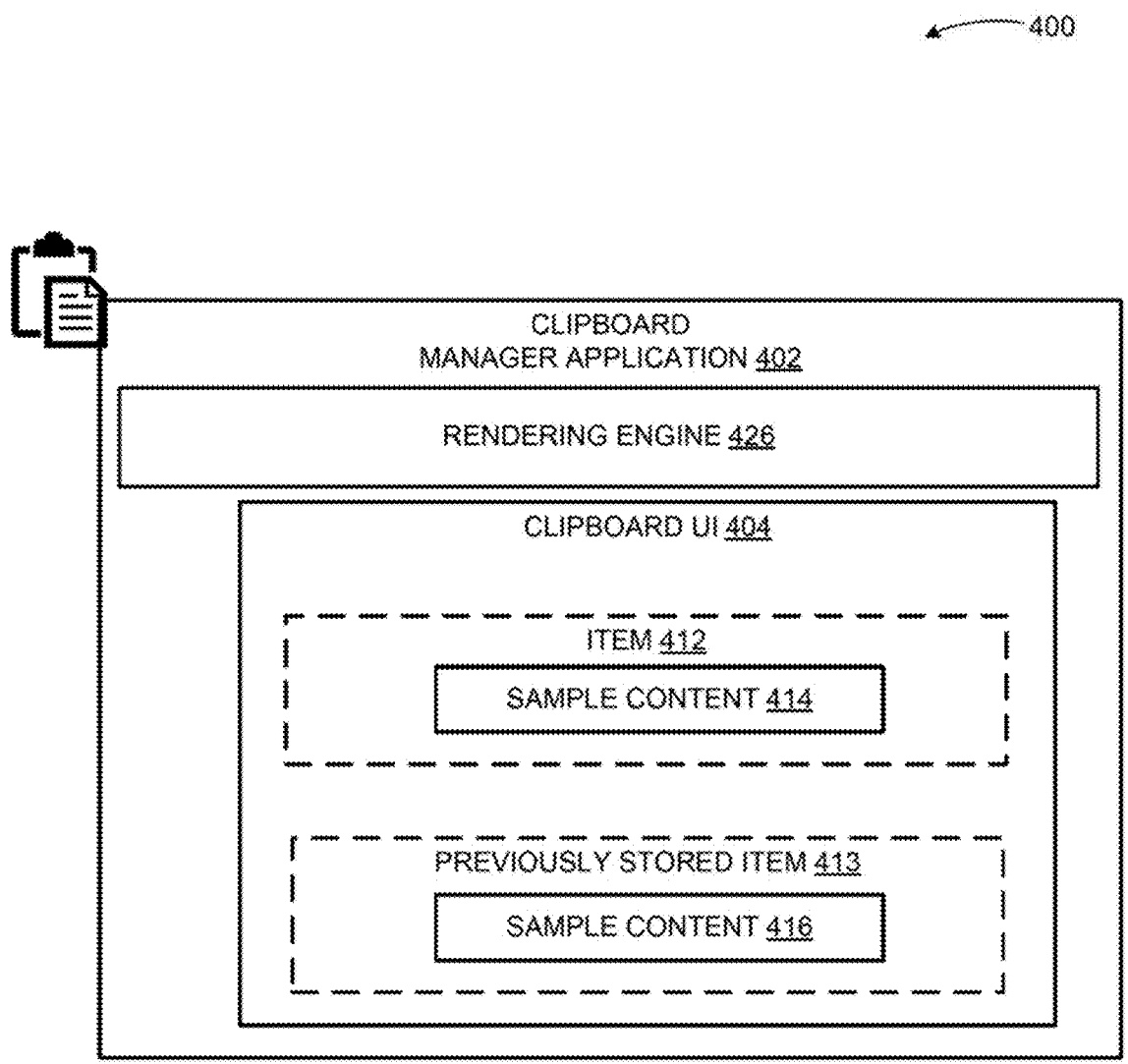
FIG. 4 is a display diagram illustrating an example of a clipboard user interface providing an insertion feature, according to embodiments.

FIG. 4 is a display diagram illustrating an example of a clipboard user interface providing an insertion feature, according to embodiments.

In a diagram 400, a rendering engine 426 of a clipboard manager application 402 may present a sample content 414 of an item 412 and a sample content 416 of a previously stored item 413 in a clipboard UI 404 upon intercepting a paste input. The sample contents (414 and 416) may be presented to the user (who provided the paste input) to prompt the user to make a selection between the item 412 and the previously stored item 413 (for an insertion of one of the items into a previously active application). Upon inserting the item 412 (or the previously stored item 413), the sample content 414 of the item 412 (or the sample content 416 of the previously stored item 413) may be removed from the clipboard UI 404 to prevent duplicate paste operation(s). Alternatively, the user may configure the clipboard manager application 402 to persist a presentation of the sample content 414 of the item 412 (and/or the sample content 416 of the previously stored item 413) through a number of paste operation(s). The clipboard manager application 402 may also persist the item 412 (and/or the previously stored item 413) based on continued use associated with the item 412 (and/or the previously stored item 413). A length of persistence may depend on a last use timestamp and a frequency of use associated with the item 412 (an/or the previously stored item 413).

The rendering engine 426 may automatically select what type of information to present in the sample contents (414 and 416) to represent the item 412 and the previously stored item 413. For example, the rendering engine 426 may process the item 412 and the previously stored item 413 and render attribute(s) of the item 412 and the previously stored item 413 as the sample contents (414 and 416). The attribute(s) of the item 412 and the previously stored item 413 may include a title, a subject, a contributor, an author, a timestamp, and/or a classification, among others associated with the item 412 and/or the previously stored item 413.

As discussed above, the clipboard manager application may be employed to provide an insertion feature. An increased user efficiency with the clipboard manager application 102 may occur as a result of intercepting a paste input to present a clipboard UI. Presenting items for a selection and a subsequent automated paste operation with the selected item, by the clipboard manager application 102, may reduce processor load, increase processing speed, conserve memory, and reduce network bandwidth usage.

Embodiments, as described herein, address a need that arises from a lack of efficiency to provide an insertion feature with a clipboard manager application. The actions/operations described herein are not a mere use of a computer, but address results that are a direct consequence of software used as a service offered to large numbers of users and applications.

The example scenarios and schemas in FIG. 1 through 4 are shown with specific components, data types, and configurations. Embodiments are not limited to systems according to these example configurations. Providing an insertion feature with a clipboard manager application may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
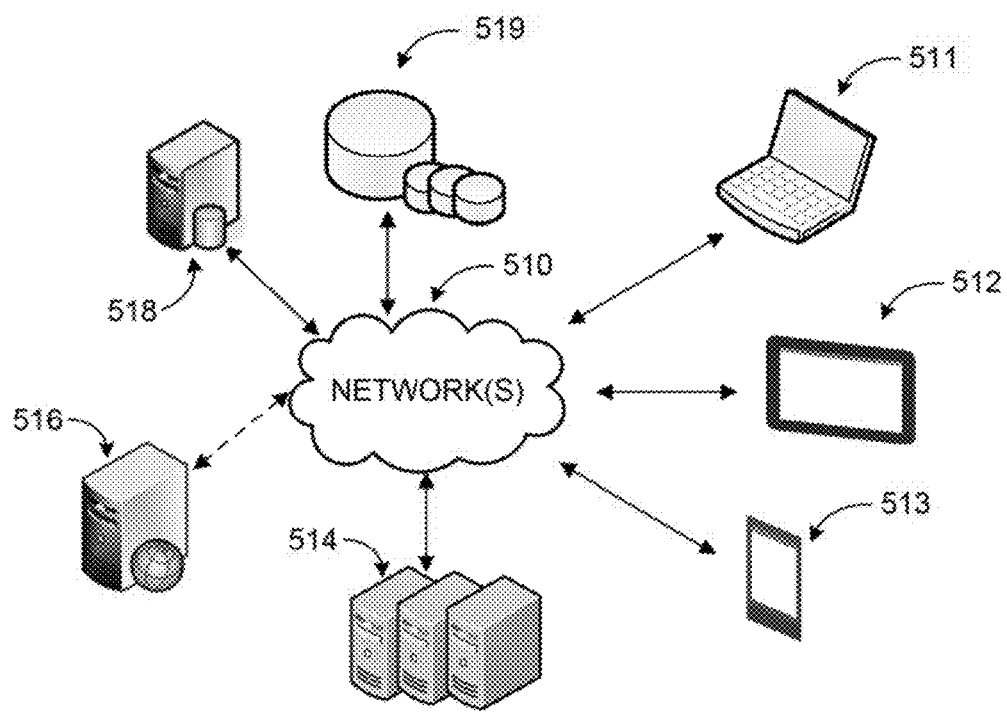
FIG. 5 is a simplified networked environment, where a system according to embodiments may be implemented.

FIG. 5 is an example networked environment, where embodiments may be implemented. A clipboard manager application configured to provide an insertion feature may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. A clipboard manager application may store an item associated with a copy operation upon detecting the copy operation. Next, a paste input may be intercepted. A sample content of the item may be rendered in a clipboard user interface (UI) for a selection. Upon detecting the item as selected, the item may be inserted into a previously active application. The clipboard manager application may store data associated with item(s) (presented for a paste operation) in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide an insertion feature with a clipboard manager application. Furthermore, the networked environments discussed in FIG. 5 are for illustration purposes only. Embodiments are not limited to the example applications, modules, or processes.

Figure 6:
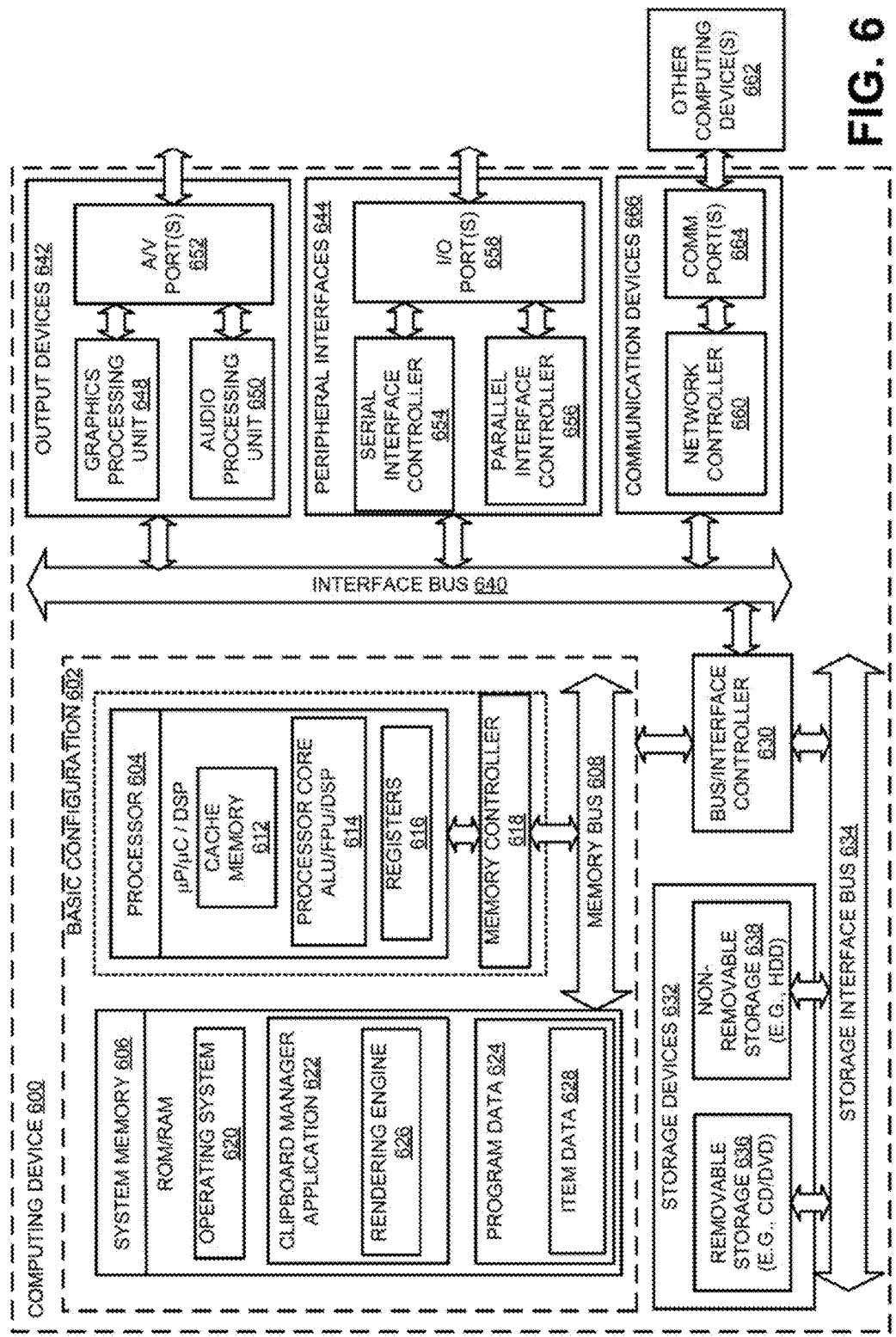
FIG. 6 is a block diagram of an example computing device, which may be used to provide an insertion feature with a clipboard manager application, according to embodiments.

FIG. 6 is a block diagram of an example computing device, which may be used to provide an insertion feature with a clipboard manager application, according to embodiments.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including but not limited to a microprocessor (μP), a microcontroller (μC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a clipboard manager application 622, and a program data 624. The clipboard manager application 622 may include components such as a rendering engine 626. The rendering engine 626 may execute the processes associated with the clipboard manager application 622. The rendering engine 626 may store an item associated with a copy operation upon detecting the copy operation. Next, a paste input may be intercepted. A sample content of the item may be rendered in a clipboard UI for a selection. Upon detecting the item as selected, the item may be inserted into a previously active application.

The clipboard manager application 622 may render the item(s) in a clipboard UI through a display component associated with the computing device 600. An example of the display component may include a monitor, and/or a touch screen, among others that may be communicatively coupled to the computing device 600. The program data 624 may also include, among other data, item data 628, or the like, as described herein. The item data 628 may include sample content of the item(s).

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDDs), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example of the communication device(s) 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods to provide an insertion feature with a clipboard manager application. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
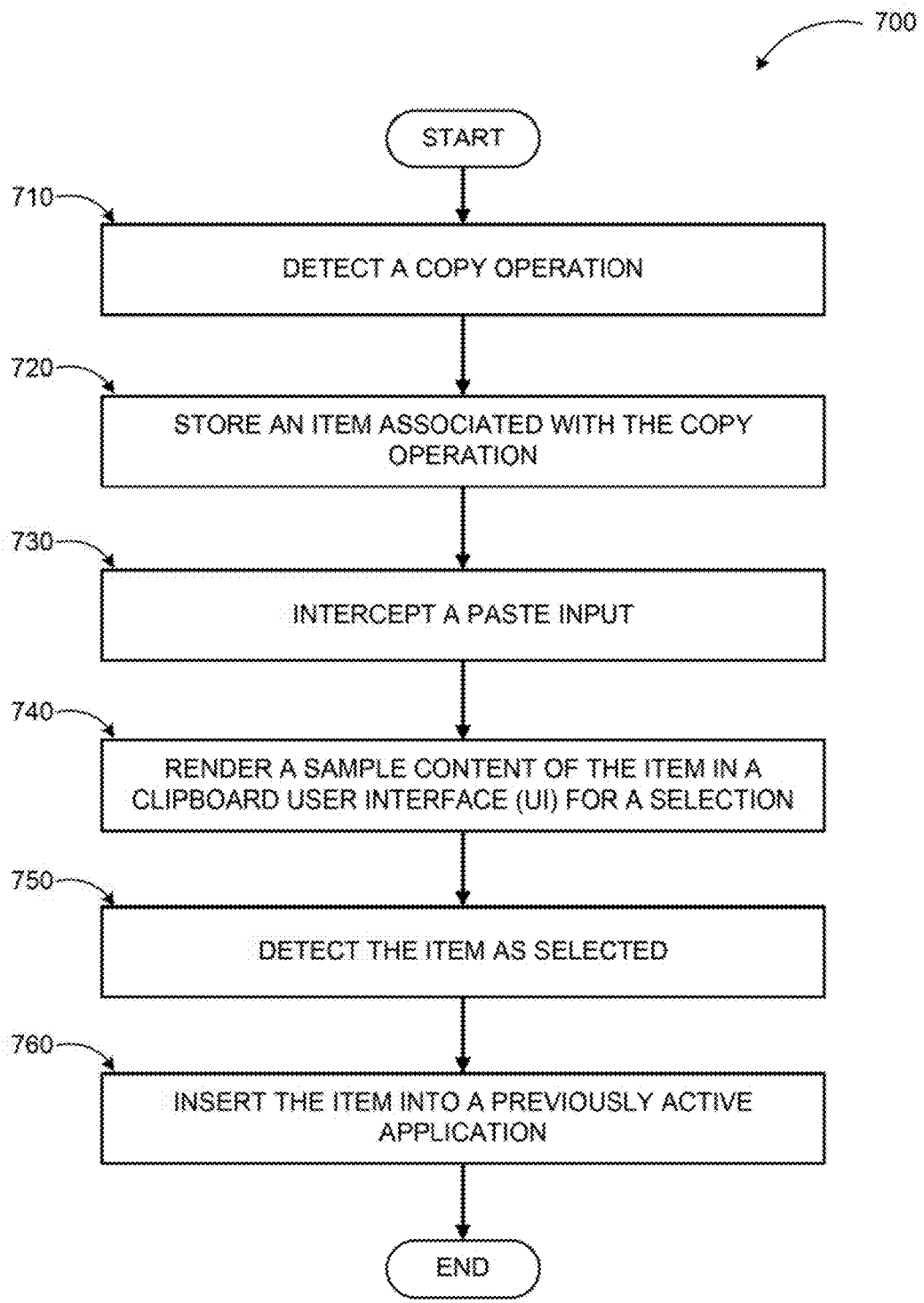
FIG. 7 is a logic flow diagram illustrating a process for providing an insertion feature with a clipboard manager application, according to embodiments.

FIG. 7 is a logic flow diagram illustrating a process for providing an insertion feature with a clipboard manager application, according to embodiments. Process 700 may be implemented on a computing device, such as the computing device 600 or another system.

Process 700 begins with operation 710, where the clipboard manager application detects a copy operation. The copy operation may include capturing of an item from a currently active application as instigated by a user. Next, at operation 720, the item associated with the copy operation may be stored. The item may be stored in a local cache of the clipboard manager application. Alternatively, the item may be stored in a system clipboard. At operation 730, a paste input may be intercepted. The paste input may include a command by the user to insert the item into the previously active application. The clipboard manager application may intercept the paste input to interrupt a default paste and/or copy operation of an OS (that executes the clipboard manager application).

Next, at operation 740, a sample content of the item may be rendered in a clipboard UI for a selection. The item may be presented in the UI to prompt the user to select the item (or other presented item(s)) for an insertion in a system paste operation. The item may be detected as selected at operation 750. In response, at operation 760, the item may be inserted into a previously active application.

The operations included in process 700 is for illustration purposes. Providing an insertion feature with a clipboard manager application may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

In some examples, a computing device to provide an insertion feature with a clipboard manager application is described. The computing device includes a display component, a memory configured to store instructions associated with the clipboard manager application, and a processor coupled to the memory and the display component. The processor executes the clipboard manager application in conjunction with the instructions stored in the memory. The clipboard application includes a rendering engine. The rendering engine is configured to detect a copy operation, store an item associated with the copy operation, intercept a paste input, render, on the display component, a sample content of the item in a clipboard user interface (UI) for a selection, detect the item as selected, and insert the item into a previously active application.

In other examples, the rendering engine is further configured to detect an application switch event, record an application identifier associated with the application switch event, and identify the previously active application from the application identifier. The application switch event is emitted by an operating system (OS) that executes the clipboard manager application and the previously active application. The application switch event is triggered by an operation system (OS) when an OS focus is detected as shifted from the previously active application to a currently active application. The rendering engine is further configured to identify the clipboard manager application from the application identifier and ignore the application switch event. The rendering engine is further configured to place the item into a system clipboard provided by an operating system. The rendering engine is further configured to activate the previously active application by shifting an operating system focus to the previously active application. The rendering engine is further configured to initiate a system paste operation to prompt an operating system to insert the item into the previously active application.

In further examples, the rendering engine is further configured to detect a previously stored item associated with a previous copy operation. The rendering engine is further configured to rank the item and the previously stored item in an order based on a timestamp of the copy operation associated with the item and the previous copy operation associated with the previously stored item and render, on the display component, the sample content from each of the item and the previously stored item, where the sample content is ranked based on the order. The rendering engine is further configured to rank the item and the previously stored item in an order based on a number of one or more system paste operations associated with each of the item and the previously stored item and render, on the display component, the sample content from each of the item and the previously stored item, where the sample content is ranked based on the order.

In some examples, a method executed on a computing device to provide an insertion feature with a clipboard manager application is described. The method includes detecting a copy operation, storing an item associated with the copy operation along with a previously stored item, intercepting a paste input, rendering a sample content for each of the item and the previously stored item in a clipboard user interface (UI) for a selection, detecting the item as selected, and initiating a system paste operation to prompt an operating system (OS) to insert the item into a previously active application.

In other examples, the method further includes unregistering an OS trigger between the paste input and the system paste operation. The method further includes generating the system paste operation with the item. The method further includes registering the OS trigger to initiate the clipboard UI upon detecting other paste input. The method further includes detecting a deactivation input and reregistering the OS trigger between the paste input and the system paste operation. The sample content includes one or more of a title, a subject, a contributor, a timestamp, and a classification associated with the item.

In some examples, a computer-readable memory device with instructions stored thereon to provide an insertion feature with a clipboard manager application is described. The instructions include actions that are similar to the actions of the method.

In some examples, a means for providing an insertion feature with a clipboard manager application is described. The means for providing an insertion feature with a clipboard manager application includes a means for detecting a copy operation, a means for storing an item associated with the copy operation, a means for intercepting a paste input, a means for rendering a sample content of the item in a clipboard user interface (UI) for a selection, a means for detecting the item as selected, and a means for inserting the item into a previously active application.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to provide an insertion feature with a clipboard manager application, the computing device comprising:
   a display component;
   a memory configured to store instructions associated with the clipboard manager application;
   a processor coupled to the memory and the display component, the processor executing the clipboard manager application in conjunction with the instructions stored in the memory, wherein the clipboard manager application includes:
   a rendering engine configured to:
      detect a copy operation;
      store an item associated with the copy operation;
      prevent an operating system from activating a system paste operation by intercepting a paste input by unregistering an operating system trigger by instructing the operating system to stop initiating the operating system trigger to activate the system paste operation upon detecting the paste input;
      override a workflow of the operating system of the system paste operation by rendering, on the display component, a sample content of the item in a clipboard user interface (UI) for a selection;
      detect the item as selected; and
      insert the item into a previously active application.

2. The computing device of claim 1, wherein the rendering engine is further configured to:
   detect an application switch event;
   record an application identifier associated with the application switch event; and
   identify the previously active application from the application identifier.

3. The computing device of claim 2, wherein the application switch event is emitted by an operating system (OS) that executes the clipboard manager application and the previously active application.

4. The computing device of claim 2, wherein the application switch event is triggered by an operating system (OS) when an OS focus is detected as shifted from the previously active application to a currently active application.

5. The computing device of claim 2, wherein the rendering engine is further configured to:
   identify the clipboard manager application from the application identifier; and
   ignore the application switch event.

6. The computing device of claim 2, wherein the rendering engine is further configured to:
   place the item into a system clipboard provided by an operating system.

7. The computing device of claim 2, wherein the rendering engine is further configured to:
   activate the previously active application by shifting an operating system focus to the previously active application.

8. The computing device of claim 2, wherein the rendering engine is further configured to:
   initiate a system paste operation to prompt an operating system to insert the item into the previously active application.

9. The computing device of claim 1, wherein the rendering engine is further configured to:
   detect a previously stored item associated with a previous copy operation.

10. The computing device of claim 9, wherein the rendering engine is further configured to:
    rank the item and the previously stored item in an order based on a timestamp of the copy operation associated with the item and the previous copy operation associated with the previously stored item; and
    render, on the display component, the sample content from each of the item and the previously stored item, wherein the sample content is ranked based on the order.

11. The computing device of claim 9, wherein the rendering engine is further configured to:
    rank the item and the previously stored item in an order based on a number of one or more system paste operations associated with each of the item and the previously stored item; and render, on the display component, the sample content from each of the item and the previously stored item, wherein the sample content is ranked based on the order.

12. A method executed on a computing device to provide an insertion feature with a clipboard manager application, the method comprising:
    detecting a copy operation;
    storing an item associated with the copy operation along with a previously stored item;
    preventing an operating system from activating a system paste operation by intercepting a paste input by unregistering an operating system trigger by instructing the operating system to stop initiating the operating system trigger to activate the system paste operation upon detecting the paste input;
    override a workflow of the operating system of the system paste operation by rendering a sample content for each of the item and the previously stored item in a clipboard user interface (UI) for a selection;
    detecting the item as selected; and
    initiating a system paste operation to prompt an operating system (OS) to insert the item into a previously active application.

13. The method of claim 12, further comprising:
    unregistering an operating system trigger between the paste input and the system paste operation by instructing an operating system to stop initiating the operating system trigger to activate a system paste operation upon detecting the paste input.

14. The method of claim 13, further comprising:
    generating the system paste operation with the item.

15. The method of claim 13, further comprising:
    registering the OS trigger to initiate the clipboard UI upon detecting other paste input.

16. The method of claim 13, further comprising:
    detecting a deactivation input; and
    reregistering the OS trigger between the paste input and the system paste operation.

17. The method of claim 12, wherein the sample content includes one or more of a title, a subject, a contributor, a timestamp, and a classification associated with the item.

18. A computer-readable memory device with instructions stored thereon to provide an insertion feature with a clipboard manager application, the instructions comprising:
    detecting a copy operation;
    storing an item associated with the copy operation along with a previously stored item;
    preventing an operating system from activating a system paste operation by intercepting a paste input by unregistering an operating system trigger by instructing the operating system to stop initiating the operating system trigger to activate the system paste operation upon detecting the paste input;
    overriding a workflow of the operating system of the system paste operation by rendering a sample content for each of the item and the previously stored item in a clipboard user interface (UI) for a selection;
    detecting the item as selected; and
    initiating a system paste operation to prompt an operating system (OS) to insert the item into a previously active application.

19. The computer-readable memory device of claim 18, wherein the instructions further comprise:
    placing the item into a system clipboard provided by the OS; and
    activating the previously active application by shifting an OS focus to the previously active application.

20. The computer-readable memory device of claim 18, wherein the instructions further comprise:
    unregistering an operating system trigger between the paste input and the system paste operation by instructing an operating system to stop initiating the operating system trigger to activate a system paste operation upon detecting the paste input;
    generating the system paste operation with the item; and
    registering the operating system trigger to initiate the clipboard UI upon detecting other paste input.

* * * * *